United States Patent
Liang et al.

(10) Patent No.: US 10,267,403 B2
(45) Date of Patent: Apr. 23, 2019

(54) METHOD OF DESIGNING MEMBER OF SPLINE WHEEL CONTOUR, SPLINE SURFACE CONTOUR AND CAM PERIPHERY OF ROLLER-TYPE WAVE-MOTION

(71) Applicants: AXONE OPTOELECTRONICS TECHNOLOGY., LTD., Taipei (TW); PRODRIVES & MOTIONS CO., LTD., Taipei (TW)

(72) Inventors: Chia-Sheng Liang, Taipei (TW); Hung-Tai Cheng, Taipei (TW); Szu-Ming Huang, Taipei (TW)

(73) Assignees: PRODRIVES & MOTIONS CO., LTD., Taipei (TW); Chia-Sheng Liang, Taipei (TW)

( * ) Notice: Subject to any disclaimer, the term of this patent is extended or adjusted under 35 U.S.C. 154(b) by 681 days.

(21) Appl. No.: 14/843,006

(22) Filed: Sep. 2, 2015

(65) Prior Publication Data
US 2017/0002913 A1    Jan. 5, 2017

(30) Foreign Application Priority Data
Jun. 30, 2015    (TW) .............................. 104121034 A (51) Int. Cl.
*F16H 49/00* (2006.01)
*F16H 55/00* (2006.01)
*F16H 25/00* (2006.01)

(52) U.S. Cl.
CPC ........... *F16H 49/001* (2013.01); *F16H 25/00* (2013.01); *F16H 55/00* (2013.01)

(58) Field of Classification Search
CPC ..... F16H 49/001; F16H 55/0833; F16H 25/06
See application file for complete search history.

(56) References Cited

U.S. PATENT DOCUMENTS

| | | | |
|---|---|---|---|
| 1,444,717 A | 2/1923 | Webb | |
| 2,906,143 A | 9/1959 | Musser | |
| 4,023,440 A * | 5/1977 | Kennington | F16H 1/32 475/159 |
| 4,526,064 A * | 7/1985 | Carden | F16H 1/32 416/170 R |
| 4,643,047 A * | 2/1987 | Distin | F16H 25/06 475/168 |
| 4,850,237 A * | 7/1989 | Hatayama | F16H 49/001 74/462 |
| 5,643,128 A | 7/1997 | Kennedy | |

(Continued)

*Primary Examiner* — Jacob J Cigna
(74) *Attorney, Agent, or Firm* — Chun-Ming Shih (57) ABSTRACT

A method for designing a spline surface contour of a roller-type wave-motion includes of the steps of slicing radial movement track of a roller between a cam and a spline aperture and circumference rotation track at equal proportion at equal time intervals to sequentially obtain circle centers and points of tangency of the track circles during movement of the roller; connecting the points of tangency to form a unit cam circumference segment of a cam periphery in order to draw and form a single-sided tooth flank contour; and forming a correspondent side tooth flank contour by mirroring and projecting the single-sided tooth flank contour. A method of forming a spline wheel contour and a method of forming a cam periphery are obtained.

7 Claims, 6 Drawing Sheets

(56) References Cited

U.S. PATENT DOCUMENTS

| | | | | |
|---|---|---|---|---|
| 5,695,425 | A * | 12/1997 | Hashimoto | F16H 1/32 475/168 |
| 5,707,310 | A * | 1/1998 | Maeguchi | F16H 1/32 475/162 |
| 6,230,587 | B1 * | 5/2001 | Grill | F16H 55/0833 74/640 |
| 8,256,327 | B2 * | 9/2012 | Schreiber | F16H 25/06 74/22 R |
| 9,897,189 | B2 * | 2/2018 | Liang | F16H 49/001 |
| 2010/0077882 | A1 * | 4/2010 | Schreiber | F16H 25/06 74/461 |
| 2016/0245386 | A1 * | 8/2016 | Rossberger | F16H 49/001 |

* cited by examiner

METHOD OF DESIGNING MEMBER OF SPLINE WHEEL CONTOUR, SPLINE SURFACE CONTOUR AND CAM PERIPHERY OF ROLLER-TYPE WAVE-MOTION

BACKGROUND OF THE INVENTION

1. Field of the Invention

The present invention relates to a method of designing a member of roller-type wave-motion, particularly to a method of designing a spline wheel contour, a spline surface contour and a cam periphery of a roller-type wave-motion.

2. Description of Related Art

In the conventional techniques, there are no wave-motions involved. A similar wave-motion of the prior arts is spin-wave driver for generating sine or cosine transmission waveforms.

Conventional spin-wave drivers and planetary gears belong to typical speed reduction gearing devices. A spin-wave driver is a speed reduction gearing device. The first spin-wave driver invented is a Harmonic® driver disclosed in U.S. Pat. No. 2,906,143 filed in 1955 by C. W. Musser. After continuous improvement, details of a spin-wave driver mechanism are disclosed in U.S. Pat. No. 5,643,128. In comparison to conventional planetary gears, conventional spin-wave drivers could provide more amounts of teeth on engaged gears and a larger amount of gear range, therefore, conventional spin-wave drivers provide better driving accuracy and driving efficiency regarding output value of the whole ratio of reduction.

In summary, a general conventional spin-wave driver comprises a cam (or a so-called wave generator), a plurality of rollers and a spline wheel (having specific internally toothed circular spline wheel) from inside to outside. The cam is used as an input shaft. The plurality of rollers are arranged around a location between the cam and the spline wheel. A plurality of spline apertures which could accommodate rollers to engage are arranged on the spline wheel in ring-shaped form. The cam is used to drive some of the plurality of rollers by providing input force so as to engage the corresponding spline apertures of the spline wheel in order to rotate a bearing member at a ratio of reduction.

Furthermore, from the contents of the prior arts, it could be known that every spline aperture in the conventional spin-wave drivers comprises a tilting tooth flank extending along both sides of a void between the teeth and the tooth flank and the tooth flank at both sides extents and connects to a crest of teeth at both sides. The contour shape of each spline aperture is approximately V-shaped. Some of the rollers in the conventional spin-wave driving process would engage with tooth flank of the engaged spline aperture driven by a cam surface of the cam. Then, the tooth flank of the spline aperture is used as an effective contact surface for transmitting driving force of the rollers. For example, in U.S. Pat. No. 5,643,128, it is disclosed that a bearing member (roller ring) for receiving a plurality of rollers is arranged between the cam and the spline wheel. In some embodiments, the bearing member is used as an output shaft so as to drive the bearing member to rotate at a ratio of reduction by a force provided by rollers driven and transmitted by a driving force of the cam via transmission of the tooth flank of the spline aperture.

From the above descriptions, it could be known that not only the tooth flank of the spline apertures could be used as an effective contacting surface for transmitting working force, but also it could be used as an effective contacting surface for providing force to the rollers from the cam. We could observe that during the spin-wave driving process, when the cam surface pushes and drives the rollers to contact the tooth flank of the spline apertures, the driven rollers move to a displacement at a radial direction along the cam axis and to an angular displacement at an angular direction surrounding the cam axis. Then, the displacements would affect whether the tooth flank could be an effective contacting surface for sufficiently or really transmitting functional force and providing force generated by the cam. The conventional spin-wave drivers could maintain good driving accuracy and driving efficiency. However, in prior arts, the contour of the disclosed spline apertures is in V-shaped form. The well-known prior arts do not disclose or teach or study that the techniques of forming the contour of spline apertures and the cams are capable of effectively transmitting functional force, such as, when an input shaft rotates for half a circle, the rollers would move into a next position of the spline aperture. During the procedures, the speed would become uncertain because of an unclear definition of the V-shape so that the speed of the roller moving into the next spline aperture would become unstable. The driving accuracy of the conventional spin-wave drivers regarding output end under variation of tiny rotational angle would be affected.

SUMMARY OF THE INVENTION

The objective of the present invention is to provide techniques for improving formation the tooth flank contour of V-shaped spline apertures of conventional spin-wave drivers without considering moving way of the rollers along the spline apertures. Thus, it would be difficult for the conventional techniques to provide an effective contact surface for the rollers to exert force on the cam so as to affect driving accuracy of the tiny rotational angle at the output side.

To achieve the objective and to solve the above problems, the method of the present invention for designing a spline surface contour of a roller-type wave-motion comprising the following steps:

(A) slicing radial direction movement track of a roller between a cam and a spline aperture and circumference direction rotation track at equal proportion at equal time intervals to sequentially obtain circle centers and points of tangency of the track circles during movement of the roller;

(B) connecting the points of tangency to form a single-sided tooth flank contour on spline aperture between a tooth crest and a void between the teeth; and (C) forming a correspondent side tooth flank contour by mirroring and projecting the single-sided tooth flank contour based on a centerline of the void between the teeth in order to form the spline surface contour by connecting a void contour between the single-sided tooth flank contour and the correspondent side tooth flank contour.

For the present invention, preferably the X-coordinates and Y-coordinates $(X_n, Y_n)$ of the circle centers of the track circles are obtained according to the following equation before obtaining point of tangency of the track circles $$[X_n, y_n] = [(L_f - N \cdot \Delta y) \cdot \sin(N \cdot \Delta \theta),$$

$$(L_f - N \cdot \Delta y) \cdot \cos(N \cdot \Delta \theta),]$$

wherein, $L_f$ is a distance between a cam axis and a circle center of the track circle of a roller far away from the cam axis, N is an amount for equally dividing the single-sided tooth flank contour of the spline aperture, $\Delta y$ is an equal divided amount of an effective radial displacement for each of the track circles of the roller, $\Delta \theta$ is an equal divided amount of an effective rotational angle for each of the track circles of the roller.

According to the present invention, the X-coordinates and Y-coordinates $(X'_n, Y'_n)$ of the point of tangency of the track circles are obtained according to the following equation $$\{X'_n, Y'_n\} = \left\{ X_n + \left(\frac{R_d}{2}\right) \cdot \sin\left[\tan^{-1}\left|\frac{(Y_n - Y_{n-1})}{(X_n - X_{n-1})}\right|\right], Y_n + \left(\frac{R_d}{2}\right) \cdot \cos\left[\tan^{-1}\left|\frac{(Y_n - Y_{n-1})}{(X_n - X_{n-1})}\right|\right] \right\}$$

wherein, n is an integer representing a $n^{th}$ track circle during movement of the roller, n is an integer larger than zero, $R_d$ is a diameter of the roller, $(X_{n-1}, Y_{n-1})$ is an X-coordinate and Y-coordinate $(X_{n-1}, Y_{n-1})$ of the $n^{th}$ circle center of the track circles.

It is another objective of the present invention to provide techniques for improving formation the tooth flank contour of V-shaped spline apertures of conventional spin-wave drivers without considering moving way of the rollers along the spline apertures. Thus, it would be difficult for the conventional techniques to provide an effective contact surface for the rollers to exert force on the cam so as to affect driving accuracy of the tiny rotational angle at the output side.

It is another objective of the present invention to provide a method for designing a spline wheel contour of a roller-type wave-motion comprising the following steps:
applying the above designing method; and
based on a rotational center of the cam axis, arranging an array of internal cam faces around the spline wheel at equal circumference distance on the spline surface contour to form a spline wheel contour.

It is another objective of the present invention to provide techniques for improving formation the cam circumference segment of conventional spin-wave drivers without considering moving way of the rollers along the spline apertures so as to affect driving accuracy of the tiny rotational angle.

It is another objective of the present invention to provide a method for designing a cam periphery of a roller-type wave-motion comprising the following steps:
(A) slicing radial movement track of a roller between a cam and a spline aperture and circumference rotation track at equal proportion at equal time intervals to sequentially obtain circle centers and point of tangency of the track circles during movement of the roller;
(B) connecting the points of tangency to form a unit cam circumference segment of a cam periphery; and
(C) forming the cam periphery by mirroring and projecting the unit cam circumference segment respectively based on a X-coordinate and Y-coordinate from a cam axis.

According to the present invention, the X-coordinates and Y-coordinates $(X_m, Y_m)$ of the circle centers of the track circles are obtained preferably before obtaining the point of tangency of the track circles according to the following equation $$[X_m, Y_m] = [-(L_f - M \cdot \Delta y') \cdot \sin(M \cdot \Delta \alpha),$$

$$(L_f - M \cdot \Delta y') \cdot \cos(M \cdot \Delta \alpha),]$$

wherein, $L_f$ is a distance between a cam axis and a circle center of the track circle of a roller far away from the cam axis, M is an amount for equally dividing the single-sided tooth flank contour of the spline aperture, $\Delta y'$ is an equal divided amount of an effective radial displacement for each of the track circles of the roller, $\Delta \alpha$ is an equal divided amount of an effective rotational angle for each of the track circles of the roller.

According to the present invention, The X-coordinates and Y-coordinates $(X'_m, Y'_m)$ of the point of tangency of the track circles are obtained according to the following equation $$\{X'_m, Y'_m\} = \left\{ X_m + \left(\frac{R_d}{2}\right) \cdot \sin\left[\tan^{-1}\left|\frac{(Y_m - Y_{m-1})}{(X_m - X_{m-1})}\right|\right],\right.$$

$$\left. Y_m + \left(\frac{R_d}{2}\right) \cdot \cos\left[\tan^{-1}\left|\frac{(Y_m - Y_{m-1})}{(X_m - X_{m-1})}\right|\right] \right\}$$

wherein, m is an integer representing a $m^{th}$ track circle during movement of the roller, m is an integer larger than zero, $R_d$ is a diameter of the roller, $(X_{m-1}, Y_{m-1})$ is an X-coordinate and Y-coordinate $(X_{m-1}, Y_{m-1})$ of the $m^{th}$ circle center of the track circles.

According to the above technical means, the effects of the present invention are of the followings: In accordance with ideal moving way of the rollers in the roller-type wave-motion, the method can design a tooth flank contour of the V-shaped spline apertures in order to design a cam circumference segment of a spline wheel, and can design a cam periphery matched with the spline apertures in the spline wheel according to the ideal moving way of the rollers in the roller-type wave-motion so as to sufficiently and really transmit driving force exerted from the rollers via a tooth flank during a process of the cam surface pushing the rollers to contact tooth flank of the spline apertures. The tooth flank can be used as an effective contact surface for the roller to provide force in order to maintain good driving accuracy and driving efficiency at a ratio of reduction of a certain output value for the roller-type wave-motion, and the driving accuracy at the output end of the roller-type wave-motion is increased.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
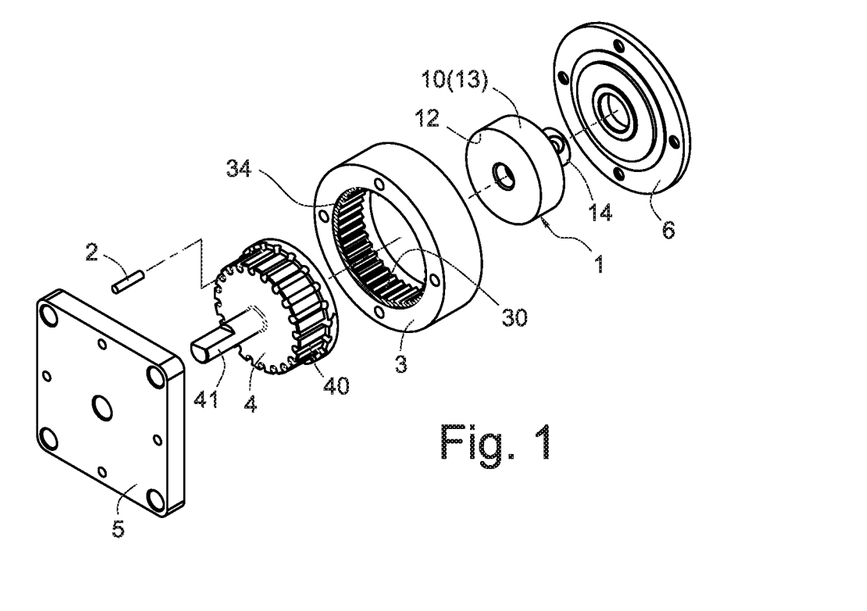
FIG. 1 is a three-dimensional explosive view of a roller-type wave-motion of the present invention.
Figure 2:
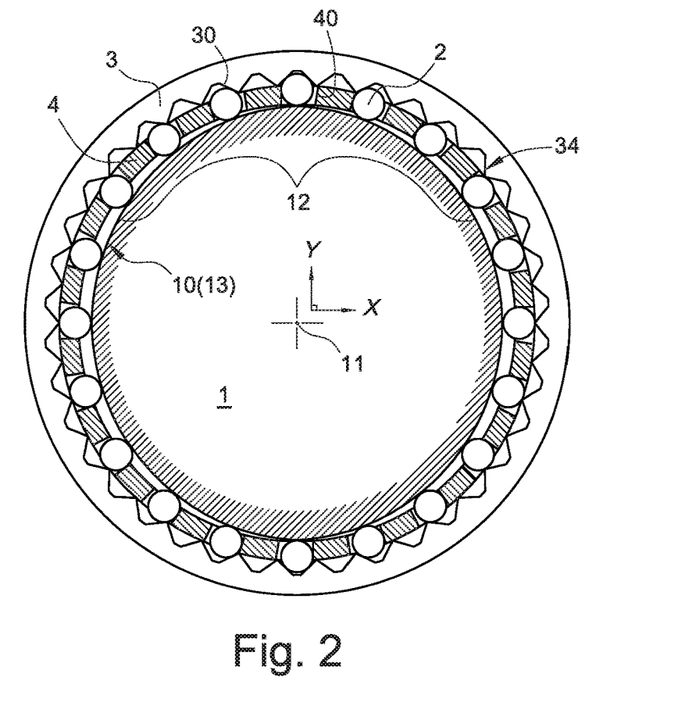
FIG. 2 is a cross-section view showing the roller-type wave-motion of the present invention.

Please refer to FIGS. 1 and 2 which respectively demonstrate the members and the arrangement of the roller-type wave-motion designed in the present invention. A cam 1, a plurality of rollers 2, a bearing member 4 and a spline wheel 3 are arranged co-axially from outside to inside between a seat 5 and a cover 6 in the wave-type wave-motion. An input shaft 14 is disposed at the axial position of the cam 1 to be used as an input end of the torque of the wave-type wave-motion. The input shaft 14 can be transmitted rotational energy to input and drive the cam 1 to rotate. A convex arc 12 in spline line shape and relatively far from the axis 11 is disposed a cam surface 10 of the cam 1. The convex arc 12 is used as an effective functional area for pushing and driving the roller to transmit power. A cam periphery 13 is formed on the cam 1. In a preferred embodiment of the invention, the roller 2 is in cylinder shape. But, the roller 2 might be a bearing bead used as a roller part. The spline wheel 3 is in ring shape and is disposed co-axially at the outside of the cam surface 10 of the cam 1. A plurality of spline apertures 30 are disposed at the inner wall of the spline wheel 3 so as to accommodate the roller 2 to be arranged between the cam surface 10 of the cam 1 and the spline apertures 30 of the spline wheel 3. The bearing member 4 is disposed between the cam 1 and the spline wheel 3. An output shaft 41 disposed at an axial position of the bearing member 4 to be used as an output end of the power of the roller-type wave-motion. A plurality of bearing apertures 40 for accommodating the rollers 2 to rotate are disposed at equal space of the circumference of the bearing member 4.

Figure 2A:
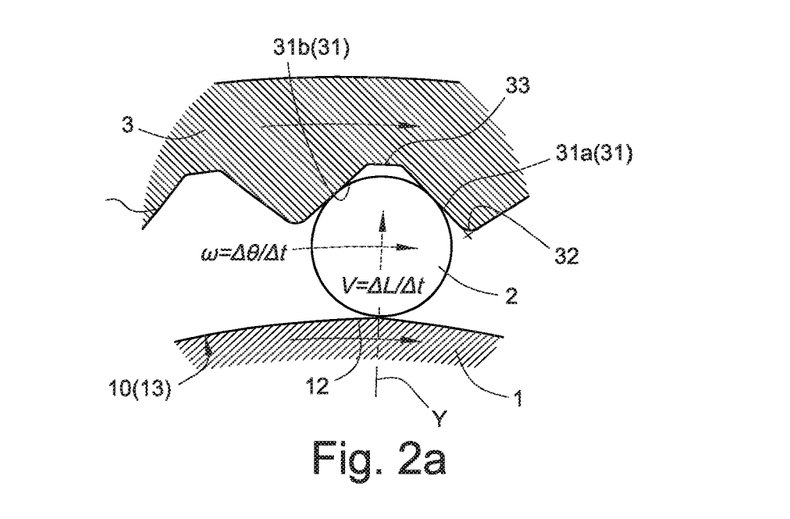
FIG. 2a illustrates an enlarged view of a spline aperture, a cam and the rollers of FIG. 2.

Please refer to FIG. 2a which shows an enlarged schematic diagram demonstrating the special relationship of the spline aperture 30, the cam 1 and the roller 2. In the preferred embodiment of the invention, FIG. 2a demonstrates that the convex arc 12 of the cam surface 10 drives some rollers 2 to move into a relative location of the spline apertures 30 so as to contact the spline surface contour 31, then, the bearing member 4 is driven by the transmitted driving force to generate a output rotation at a predetermined ratio of reduction.

For facilitating demonstration, in a preferred embodiment, the input shaft 14 of the cam 1 is used as an input end and the spline wheel 3 is used to form a output shaft 41 at an axial position of the bearing member 4 as a output member. In a scope of the present invention, the bearing member 4 is included to demonstrate that the spline wheel 3 is used as an output end. Moreover, no matter the spline wheel 3 or the bearing member 4 is used as an output end, it will not affect the results showing the demonstration of spline surface contour, spline wheel contour and the cam periphery.

In the above example, the spline surface contour 31 comprises a single-sided tooth flank contour 31a and a correspondent side tooth flank contour 31b formed at a mirroring location of it. A void contour 33 is formed between the single-sided tooth flank contour 31a and the correspondent side tooth flank contour 31b to form a spline wheel contour 34 (as shown in FIG. 1) by an array of the spline surface contour 31 for surrounding it. When the spline wheel contour 34 is formed, a single-side tooth flank contour 31a and a correspondent side tooth flank contour 31b of each spline surface contour 31 are respectively connected to a tooth crest contour 32 at a relatively far side to show the detailed of the spline wheel contour 34. The said spline wheel contour 34 is referred to a specific contour of the inner wall of the spline wheel 3.

Figure 3:
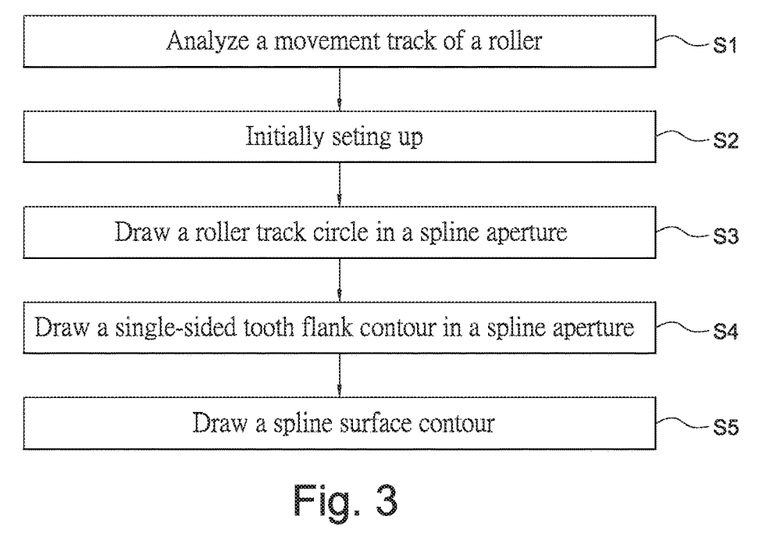
FIG. 3 is a flow chart showing a process and steps for designing a spline surface contour according to the invention.

In order to clearly and definitely show the arrangement of FIGS. 1 and 2, the present invention provide a preferred design plan regarding the spline surface contour 31 comprising steps of S1 to S5 (as shown in FIG. 3).

Step S1: designing a movement track of a roller;

Before the arrangement of cam periphery 13 and spline surface contour 31 is known, the movement track of the roller 2 is analyzed firstly. In more details, when the convex arc 12 of the cam surface 10 contacts the roller 2 to gradually push to generate two kinds of movement velocities in the spline aperture 30. The two movement velocities include a radial movement velocity v in the radial direction relative to the cam axis 11 and an angular velocity ω in the rotational direction of the circumference of the cam 1 (as shown in FIG. 2a). A radial displacement amount L is equally divided by using an equal amount of unit time t to get a radial displacement velocity v ($\Delta L = v \times \Delta t$). The unit time t is used to divide an effective rotation angular θ in the circumference direction to get an angular velocity ω ($\Delta \theta = \omega \times \Delta t$) so as to obtaining and simulating movement tracks of the roller 2 in spline aperture 30 and to draw track circles (as shown in steps 2 to 4).

step S2: initially setting up.

Figure 4:
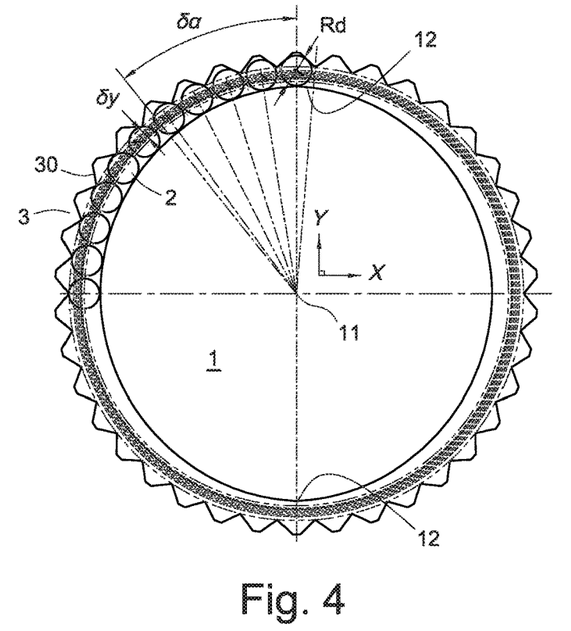
FIG. 4 is a cross-sectional view showing a spline surface contour and a cam periphery according to the invention.

In order to meet the requirements of good ratio of reduction and arrangement dimensional size, FIG. 4 can be drawn by the following data and steps in the following examples. FIG. 4 is demonstrated to show a figure in four quadrants of X-Y coordinate system, especially to show a figure of track circles of the roller 2 in the second quadrant by using the set parameters. The set-up parameters are as follows:

1. a set amount $R_n$ of the rollers $R_n=40$. In order to make sure that the rigidity of the bearing apertures 40 is excellent, the actual amount of the rollers and bearing apertures is a half of $R_n$.

2. a set amount $C_n$ of the convex arcs of the cam 1 $C_n=2$.

3. an amount of the spline apertures $S_n=C_n=40-2=38$.

4. a roller diameter $R_d=2.0$ mm.

5. an effective function amount $E_n$ of the rollers is non-integer number, for example $E_n=5.3$.

step S3: drawing track circles of the rollers in the spline apertures.

Figure 5:
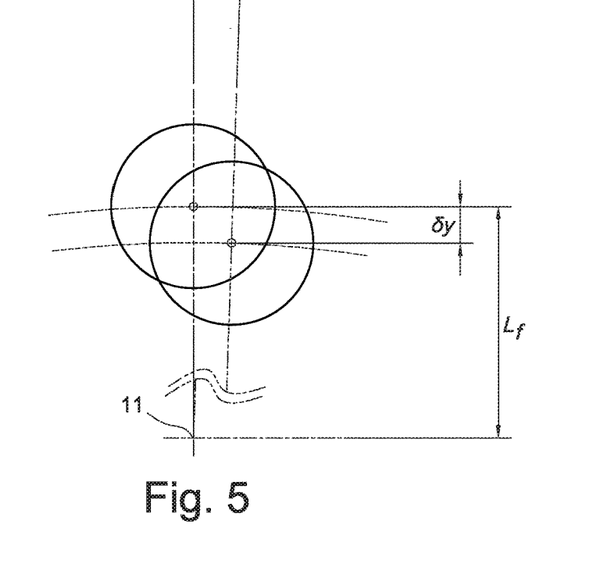
FIG. 5 is an enlarged schematic diagram showing an effective movement range of track circles of rollers in the spline aperture according to the invention.

According to set arrangement of step 2, a figure of an effective movement range of the roller track circles is drawn as shown in FIG. 5 (matched with FIG. 4) based on the following parameters and definition of the above example:

6. a distance $L_f$ between a circle center of a roller track circles of farest from cam axis 11 and the cam axis 11, predetermined coordinates $(0, L_f)$, wherein $L_f=14.6$ mm.

7. a tangent angle between two initially set track circles in the example: 44.5°~45.5°.

8. an effective radial displacement of the roller: 0.52 mm.

9. an effective circumference angle of the roller δα

$$\delta\alpha = \frac{360}{R_n} \times (E_n - 1) = \frac{360}{40} \times (5.3 - 1) = 38.7°$$

(as shown in FIG. 3).

10. from the above descriptions, a relative angular difference AP between the spline aperture and the roller is calculated:

$$\Delta\beta = \frac{360}{R_n} - \frac{360}{S_n} = \frac{360}{38} - \frac{360}{40} = 0.47368°$$

(not shown).

11. a displacement angle $\delta\theta$ of an effective function range of the single-sided tooth flank contour 31a of the set spline aperture 30, i.e.

$$\delta\theta = \left(\frac{360}{R_n} - \frac{360}{S_n}\right) \times (E_n - 1) = \left(\frac{360}{38} - \frac{360}{40}\right) \times (5.3 - 1) = 2.0368°.$$

Figure 6:
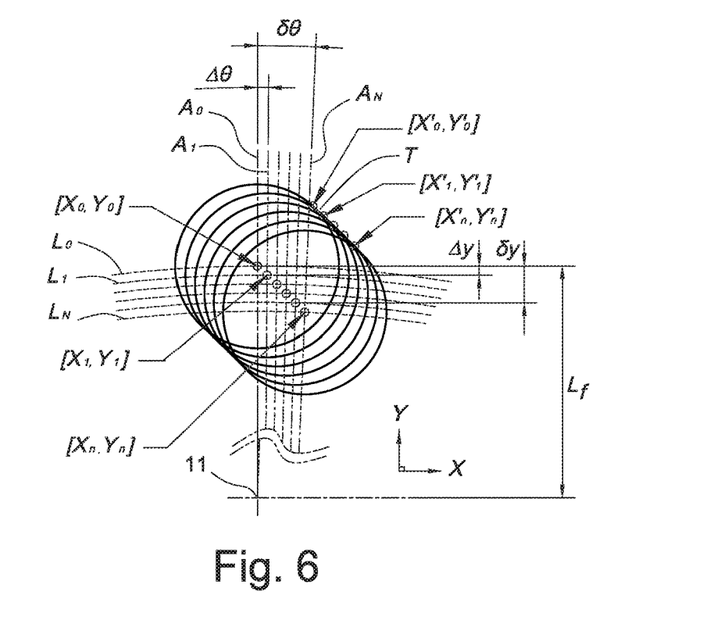
FIG. 6 is a schematic diagram showing an equal amount of proportional effective movement range of the track circles of the rollers according to the invention.

After the status of FIG. 5, an appropriate equal amount N for the effective movement range (including the effective radial displacement amount $\delta y$ and the effective circumference displacement angle $\delta\theta$) is drawn and divided. The equal amount N is used as an equal amount for dividing the single-sided tooth flank contour 31a of the spline aperture as shown in FIG. 6. A proportionally equal amount of effective radial displacement divided by the equal amount N (e.g. N=100) for a radial displacement $\Delta y$ of each track circle is as follows:

$$\Delta y = \frac{\delta y}{N} = \frac{0.52}{100} = 0.0052 \text{ mm.}$$

The arc lines generated are numbered from outside to inside as $L_0, L_1, L_2, \ldots L_N$. The rotational angle $\Delta\theta$ of each roller track circle for an effective rotational angle obtained by divided using an predetermined equal amount of N is as follows:

$$\Delta\theta = \frac{\delta\theta}{N} = \frac{2.0368}{100} = 0.0203684°.$$

The radiation lines generated are numbered from left to right as $A_0, A_1, A_2, \ldots, A_N$.

Thus, each intersection point intersected by the arc lines $L_0, L_1, L_2, \ldots L_N$ and the radiation lines $A_0, A_1, A_2, \ldots, A_N$ are used as circle centers of the roller track circles to sequentially draw track circles (roller diameter $R_d$=2.0 mm). The X, Y-coordinates $(X_n, Y_n)$ of the circle centers of the track circles are obtained as the following equation (1)

$$[X_n, Y_n] = [(L_f - N \cdot \Delta y) \cdot \sin(N \cdot \Delta\theta),$$

$$(L_f - N \cdot \Delta y) \cdot \cos(N \cdot \Delta\theta),]$$

Wherein, n represents a numbering integer of the track circles for each roller. n is an integer larger than zero.

From the above descriptions, the coordinates of the $1^{th}$ circle center is $[X_0, Y_0]=[0, L_f]=[0, 14.6]$. The coordinates of the $2^{th}$ circle center is $[X_1, Y_1]=[0.005188, 14.594799]$. It can be inferred that the coordinates of the $(n+1)^{th}$ circle center is $[X_n, Y_n]=[0.500433, 14.071104]$ (when n=N=100 equally divided).

step S4: drawing a single-sided tooth flank contour of the spline aperture.

After the above step S3, a tangent T is formed to connect two neighboring track circles. A $1^{th}$ circle point of tangency for each T is selected and coordinates $[X'_n, Y'_n]$ of each circle point of tangency are calculated by the following equation (2)

$$\{X'_n, Y'_n\} = \left\{X_n + \left(\frac{R_d}{2}\right) \cdot \sin\left[\tan^{-1}\left|\frac{(Y_n - Y_{n-1})}{(X_n - X_{n-1})}\right|\right], Y_n + \left(\frac{R_d}{2}\right) \cdot \cos\left[\tan^{-1}\left|\frac{(Y_n - Y_{n-1})}{(X_n - X_{n-1})}\right|\right]\right\}$$

wherein, $X_{n-1}, Y_{n-1}$ are coordinates of the circle center of the $n^{th}$ track circle.

From the above descriptions, point of tangency coordinates $[X'_0, Y'_0]$ of a $1^{th}$ track circle, point of tangency coordinates $[X'_1, Y'_1]$ of a $2^{th}$ track circle are sequentially obtained. It can be inferred that point of tangency coordinates $[X'_n, Y'_n]$ of a $(n+1)^{th}$ track circle (when n=N=100 as equal amount for dividing) are obtained.

Spline lines are used to connect the point of tangency of the circles to form a surface body. The single-sided tooth flank contour 31a between the tooth crest and tooth void is formed on the spline aperture 30. It should be noted that the tooth crest and the tooth void are the so-called predetermined space which is virtual having no real contour lines. Those skilled in the art can understand that a tooth crest and a tooth void are formed at both ends of the spline aperture tooth flank. According to the step S2, from the parameters, such as the amount $S_n$ of the spline apertures, the amount $R_n$ of the rollers and roller diameter $R_d$, the distance between the tooth crest and the tooth void on the spline wheel can be known for facilitating formation of single sided tooth flank contour 31a and the contour of the tooth crest and the tooth void after the correspondent side tooth flank contour 31b is formed.

step S5: drawing spline surface contour.

After step S4, please refer to FIG. 2, a centerline Y (actually is a connecting line between a circle center of the $0^{th}$ track circle and the cam axis 11 in FIG. 6) of virtual tooth void is used to mirror an image of the single-sided tooth flank contour 31a to form the correspondent side tooth flank contour 31b.

Circle point of tangency of two neighboring track circles between the single-sided tooth flank contour 31a and the correspondent side tooth flank contour 31b are connected and a real tooth void contour 33 which does not interfere with the circle surface of the track circles is formed at the tooth void location, then, e.g. contour lines of convex or arc shape are formed. The spline surface contour 31 is formed by connecting the void contour 33 between the single-sided tooth flank contour 31a and the correspondent side tooth flank contour 31b. The virtual tooth crest portion is drawn after the whole spline wheel contour 34 is formed.

Figure 7:
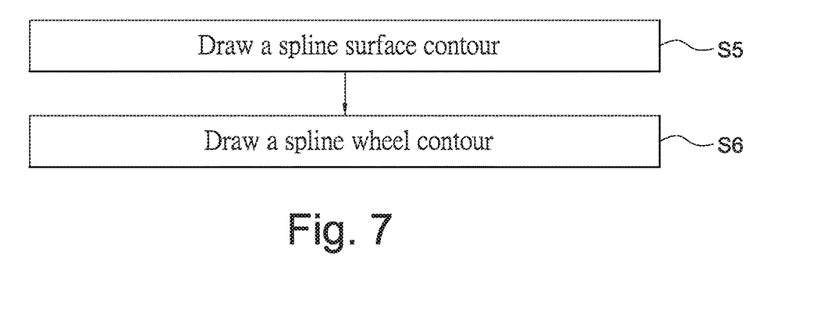
FIG. 7 is a flowchart showing a process of designing a spline wheel contour according to the invention.

Another embodiment of the invention is to implement drawing a spline wheel contour 34. In more details, the embodiment comprises the step S5 of drawing spline surface contour 31 and implementing the following step S6 (as shown in FIG. 7).

Step S6: drawing the spline wheel contour.

After the step S5, the cam axis 11 is used as a rotational center (as shown in FIG. 4), and an array spaced away at equal distance on the circumference of spline surface contour 31 having predetermined amount $S_n$ of spline apertures surrounds around an inner surface of the spline wheel 3 to form the spline wheel contour 34. The so-called equal space on the circumference means a distance formed by the predetermined virtual tooth crests.

In more details, the tooth crest portion is drawn to form a real tooth crest contour 32 (as shown in FIG. 2) comprising tips far from the single-sided tooth flank contour 31a and the correspondent side tooth flank contour 31b for each spline surface contour 31 are connected in an arc. The meaning of "tips relatively far from are connected in an arc" is that circle points of tangency of two correspondent track circles at the farest location between the single-sided tooth flank contour 31a and the correspondent side tooth flank contour 31b for each spline surface contour 31 are connected linearly in round angle way so as to form an arrangement completely exhibiting the spline wheel contour 34 connecting the tooth crest contours 32 between the spline surface contours 31. The tooth crest contour 32 is used for guiding the roller 2 to move into the adjacent spline aperture 30 to contact the spline surface contour 31. The roller guiding includes a continuous contact-type guidance or non-continuous contact-type guidance or non-contact-type guidance.

Figure 8:
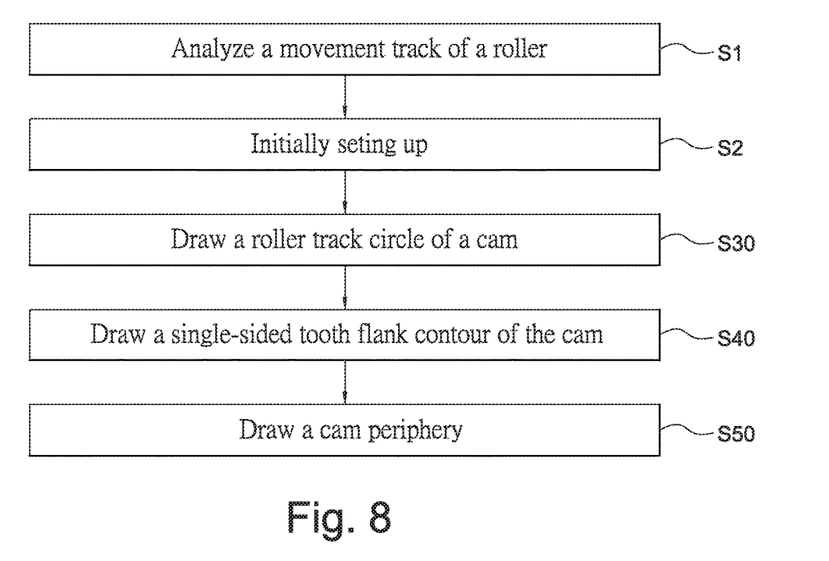
FIG. 8 is a flowchart showing a process of designing a cam periphery according to the invention.

Another embodiment of the present invention is to implement drawing of the cam periphery 13. In more details, the embodiment comprises steps of continuing the steps of S1 to S2, and executing the steps of S30 to S50 (as shown in FIG. 8).

Step S30: drawing a roller track circle of the cam.

Figure 9:
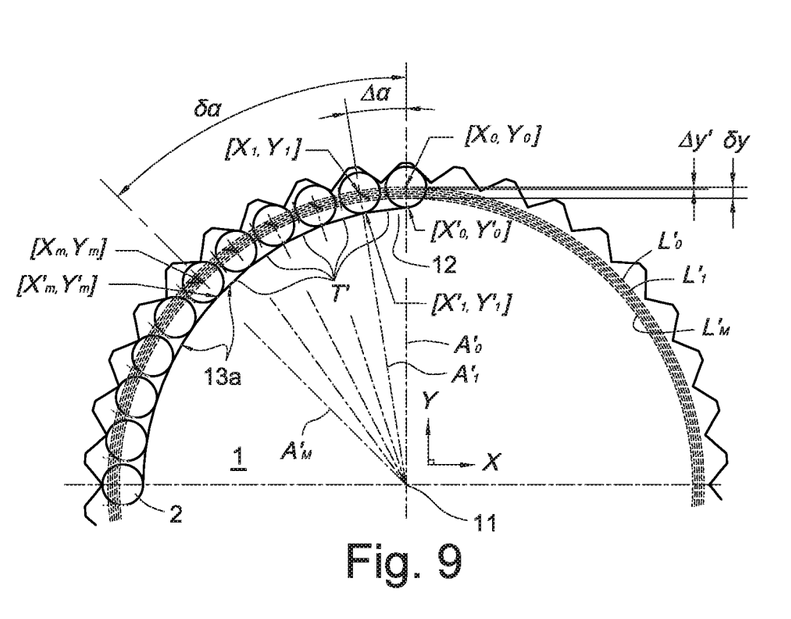
FIG. 9 is a schematic diagram showing an effective movement range of the roller's track of motion designed in this invention.

After the step 2 is set up, then, a drawing of an effective movement range of a roller track circle at the outskirt of the cam 1 is drawn according to the following parameters and definition as shown in FIG. 9.

In FIG. 9, a figure of a second quadrant of a X-Y coordinate system is drawn to demonstrate that an equal amount M, such as M=300, which is obtained by slicing an effective movement range (comprising an effective radial displacement amount $\delta y$ and an effective circumference rotational angle $\delta\alpha$) of the roller 2, is used to equally divide each track circle displacement amount $\Delta y'$ of an effective radial displacement amount of the cam periphery 13 so as to meet the following equation:

$$\Delta y' = \frac{\delta y}{M} = \frac{0.52}{300} = 0.0017333 \text{ mm}$$

and to sequentially number the arc lines into $L'_0$, $L'_1$, $L'_2$, ... $L'_M$ (M=300). Further, a rotation angle $\Delta\alpha$ of each roller track circle is obtained by proportionally dividing the effective rotational angle by the predetermined equal amount M so as to meet a following equation:

$$\Delta\alpha = \frac{\delta\alpha}{M} = \frac{38.7}{300} = 0.129°$$

to generate radiation lines from right to left numbered as $A'_0$, $A'_1$, $A'_2$, ... $A'_M$ (M=300).

Thus, each intersection point (for example, an intersect point of $L'_0$ and $A'_0$) intersected by the arc lines into $L'_0$, $L'_1$, $L'_2$, ... $L'_M$ and the correspondingly numbered $A'_0$, $A'_1$, $A'_2$, ... $A'_M$ is used as a circle center of the roller track circles to sequentially draw track circles (having a roller diameter $R_d$=2.0 mm). The margin between the roller 2 and the cam surface 10 is considered, for example, the predetermined margin for roller diameter $R_d$+default gap=2.0+0.04=2.04 mm. Accordingly, circle center coordinates $[X_m, Y_m]$ of the track circles are obtained from drawing by the following equation (3)

$$[X_m, Y_m] = [-(L_f - M \cdot \Delta y') \cdot \sin(M \cdot \Delta\alpha),$$

$$(L_f - M \cdot \Delta y') \cdot \cos(M \cdot \Delta\alpha),]$$

Accordingly, the $1^{th}$ point coordinates $[X_0, Y_0]=[0, L_f]=[0, 14.6]$ and the $2^{th}$ point coordinates $[X_1, Y_1]=[-0.032868, 14.598230]$ can be sequentially obtained. It can be inferred that the $m^{th}+1$ point coordinates $[X_m, Y_m]=[-8.803417, 10.988460]$ (when m=M=300, equally divided) of the $(m+1)^{th}$ track circle is obtained.

Step S40: drawing a unit cam periphery of the cam.

A tangent line T' is made by connecting two adjacent track circles and a $1^{th}$ circle point of tangency of the tangent line T' is selected.

And then, the point of tangency coordinates $[X'_0, Y'_0]$ of the $1^{th}$ track circle and the point of tangency coordinates $[X'_1, Y'_1]$ of the $2^{th}$ track circle are obtained. It can be inferred that the point of tangency coordinates $[X'_m, Y'_m]$ of the $(m+1)^{th}$ track circle can be obtained. Then, circle points of tangency in the $2^{th}$ quadrant are connected by using spline lines to form a single body, i.e. a unit tooth flank contour 13a on the cam periphery 13. The point of tangency location covered by connecting the tangent line T' are spline line contour location of the local convex arc 12 of the cam 1 formed in the $2^{th}$ quadrant. The range of the unit tooth flank contour 13a formed by connecting the spline lines includes a spline line contour of the local convex arc 12 and a cam circumference segment of the part other than the convex arc 12.

Step S50: drawing a cam periphery.

Please refer to FIGS. 2 and 9 which is a schematic diagram showing a unit cam circumference segment 13a (as shown in FIG. 9) formed in the $2^{th}$ quadrant drawn in step S40. Based on a cam axis 11, the cam periphery 13 is respectively mirrored and projected to the $1^{th}$, $3^{th}$ and $4^{th}$ quadrants across the X-coordinate and Y-coordinate. The so-called "respectively mirrored and projected" includes a mirroring projection across the X-coordinate and then a mirroring projection across the Y-coordinate, or a mirroring projection across the Y-coordinate and then a mirroring projection across the X-coordinate so as to form images of the unit cam circumference segment 13a in any of the four quadrants. In order to sequentially mirror and project the image onto the other three quadrants and to project the images onto the all four quadrants of X-Y coordinate system, a whole drawing of cam periphery 13 is formed by surrounding around. The extra lines and tips of the unit cam circumference segment 13a generated at an intersection point on the Y-coordinate can be revised in round angle way or in small arc way.

The word of "effective" in the above descriptions means to be effective at angle range when the roller 2, the spline wheel 3, the cam 1 and the bearing member 4 simultaneously contact. Out of the angle range, the word "effective" should be "ineffective".

In the above embodiments of the invention, the method of designing is implemented by an ideal movement way of the rollers in the roller-type wave-motion. When the cam surface 10 at the input end pushes and drives some of the rollers to move simultaneously in the radial direction and in the circumference direction in the corresponding spline aperture 30, a drawing of the formed spline surface contour 31, the spline wheel contour 34 and the cam periphery 13 is drawn to sufficiently really transmit driving force. The method comprises maintaining a transmission at a ratio of reduction. Furthermore, when the input shaft rotates to half a circle angle, the roller will move to a location of next spline aperture. The speed of the process will be at constant speed. Accordingly, the driving accuracy of the roller-type wave-motion designed in the invention is better than that of the conventional wave-motion.

Although the present invention has been explained in relation to its preferred embodiment, it is to be understood that any other possible modifications and variations can be made without departing from the scope of the invention as hereinafter claimed.

We claim:

1. A method for designing a spline surface contour of a roller-type wave-motion comprising the following steps:
   (A) slicing radial movement track of a roller between a cam and a spline aperture and circumference rotation track at equal proportion at equal time intervals to sequentially obtain circle centers and points of tangency of the track circles during movement of the roller;
   (B) connecting the points of tangency to form a single-sided tooth flank contour on spline aperture between a tooth crest and a void between the teeth; and
   (C) forming a correspondent side tooth flank contour by mirroring the single-sided tooth flank contour based on a centerline of the void between the teeth in order to form the spline surface contour by connecting a void contour between the single-sided tooth flank contour and the correspondent side tooth flank contour,
   wherein X-coordinates and Y-coordinates $(X_n, Y_n)$ of the circle centers of the track circles are obtained according to the following equation $$[X_n, Y_n] = [(L_f - N \cdot \Delta y) \cdot \sin(N \cdot \Delta \theta), (L_f - N \cdot \Delta y) \cdot \cos(N \cdot \Delta \theta),]$$

wherein, $L_f$ is a distance between a cam axis and a circle center of the track circle of a roller far away from the cam axis, N is an amount for equally dividing the single-sided tooth flank contour of the spline aperture, $\Delta y$ is an equal divided amount of an effective radial displacement for each of the track circles of the roller, $\Delta \theta$ is an equal divided amount of an effective rotational angle for each of the track circles of the roller.

2. The method for designing a spline surface contour of a roller-type wave-motion as claimed in claim 1, wherein two points of tangency of the track circles near and between the single-sided tooth flank contour and the correspondent side tooth flank contour are connected to form the void contour which does not interfere with the cam surface of the track circles.

3. The method for designing a spline surface contour of a roller-type wave-motion as claimed in claim 1, wherein X-coordinates and Y-coordinates $(X'_n, Y'_n)$ of the points of tangency of the track circles are obtained according to the following equation $$\{X'_n, Y'_n\} = \left\{X_n + \left(\frac{R_d}{2}\right) \cdot \sin\left[\tan^{-1}\left|\frac{(Y_n - Y_{n-1})}{(X_n - X_{n-1})}\right|\right], Y_n + \left(\frac{R_d}{2}\right) \cdot \cos\left[\tan^{-1}\left|\frac{(Y_n - Y_{n-1})}{(X_n - X_{n-1})}\right|\right]\right\}$$

wherein, n is an integer representing a $n^{th}$ track circle during movement of the roller, n is an integer larger than zero, $R_d$ is a diameter of the roller, $(X_{n-1}, Y_{n-1})$ is an X-coordinate and Y-coordinate $(X_{n-1}, Y_{n-1})$ of the $n^{th}$ circle center of the track circles.

4. The method for designing a spline surface contour of a roller-type wave-motion as claimed in claim 3, wherein the points of tangency of the track circles are connected to form the single-sided tooth flank contour by a spline line.

5. A method for designing a spline wheel contour of a roller-type wave-motion comprising the following steps:
   applying the designing method of claim 1; and
   based on a rotational center of the cam axis, arranging an array of internal cam faces around the spline wheel at equal circumference distance on the spline surface contour to form a spline wheel contour.

6. The method for designing a spline wheel contour of a roller-type wave-motion as claimed in claim 5, wherein two points of tangency of the correspondent track circles far away from the single-sided tooth flank contour and the correspondent side tooth flank contour are angularly connected to form a tooth crest contour by which a roller is guided to move into a neighboring spline aperture to contact spline surface contour.

7. A method for designing a cam periphery of a roller-type wave-motion comprising the following steps: (A) slicing radial movement track of a roller between a cam and a spline aperture and circumference rotation track at equal proportion at equal time intervals to sequentially obtain circle centers and point of tangency of the track circles during movement of the roller; (B) connecting the points of tangency to form a unit cam circumference segment of a cam periphery; and (C) forming the cam periphery by mirroring and projecting the unit cam circumference segment respectively based on a X-coordinate and Y-coordinate from a cam axis, wherein X-coordinates and Y-coordinates $(X_m, Y_m)$ of the circle centers of the track circles are obtained according to the following equation $$[X_m, Y_m] = [-(L_f - M \cdot \Delta y') \cdot \sin(M \cdot \Delta \alpha), (L_f - M \cdot \Delta y') \cdot \cos(M \cdot \Delta \alpha),]$$

wherein, Lf is a distance between a cam axis and a circle center of the track circle of a roller far away from the cam axis, M is an equally amount for dividing the single-sided tooth flank contour of the spline aperture, $\Delta y'$ is an equal divided amount of an effective radial displacement for each of the track circles of the roller, $\Delta \alpha$ is an equal divided amount of an effective rotational angle for each of the track circles of the roller.

* * * * *